United States Patent [19]
Foley et al.

[11] Patent Number: 5,894,040
[45] Date of Patent: Apr. 13, 1999

[54] VAPOR PHASE CORROSION INHIBITORS ON POST-CONSUMER USED OR RECYCLED PAPER

[75] Inventors: Joseph M. Foley, Maplewood; Barry Rudman, Woodbury, both of Minn.

[73] Assignee: Cortec Corporation, St. Paul, Minn.

[21] Appl. No.: 08/654,481

[22] Filed: May 30, 1996

[51] Int. Cl.⁶ .............................. B27M 1/08; B32B 1/08; B29D 22/00
[52] U.S. Cl. .............. 428/34.2; 428/34.6; 428/34.7; 428/35.5; 428/36.6; 428/537.5; 252/389.54
[58] Field of Search ........... 252/389.54; 428/34.2, 428/34.7, 35.4, 36.6, 537.5, 34.6

[56] References Cited

U.S. PATENT DOCUMENTS 5,139,700   8/1992   Miksic et al. ............. 252/389.54

*Primary Examiner*—Leszek Kiliman
*Attorney, Agent, or Firm*—Haugen and Nikolai, P.A.

[57] ABSTRACT

Pulp prepared from post-consumer used or recycled paper may be employed in the preparation of substrates which are blended with a vapor phase corrosion inhibitor for preparation and fabrication of packaging enclosures or containers. The present invention permits substrates prepared in this fashion to be employed in such applications for which they are rendered highly suitable. Because of the unknown history of the post-consumer recycled materials forming the pulp, the utility of enclosures and/or packages prepared from such pulp is expanded. Vapor phase corrosion inhibitors useful in the present invention preferably include quantities of amine salts, alkali metal molybdates, including ammonium molybdates, or mixtures of molybdates with a second component such as benzotriazole.

4 Claims, 1 Drawing Sheet

VAPOR PHASE CORROSION INHIBITORS ON POST-CONSUMER USED OR RECYCLED PAPER

BACKGROUND OF THE INVENTION

The present invention relates generally to a composite paper-resin packaging material, and more particularly to such a material which incorporates post-consumer recycled paper along with a vapor phase corrosion inhibitor for protection of the product or components being packaged.

Post-consumer recycled paper represents an important and significant material which is useful in preparing packaging materials. Post-consumer recycled paper is, of course, commercially available from a wide variety of sources including newsprint, documents of various types and packaging materials. The term "post-consumer recycled paper" is hereinafter sometimes referred to as "recycled paper".

Typically, recycled paper is defined as a paper product generated by a business or consumer which has served its intended end use, and which has been diverted from solid waste collection for purposes of recycling and ultimate re-use. Upon being collected, used paper is processed to yield a useful pulp or other product which may again be used in the preparation of a different end use product, including recycled paper. Recycling of paper as well as other resources is beneficial to the environment and acts to conserve natural resources and energy.

Because the overall history of a given piece of recycled paper is unknown, it is always possible that this material may have become contaminated so as to possess corrosive or other properties deleterious to metals. Any article which is susceptible to deterioration due to corrosion and which is subsequently packaged within a package prepared from or containing a recycled component, must be protected so as not to be subjected to damage when and if exposure to corrosive or contaminating compounds occurs. It is recognized that migration of impurities proceeds rapidly in paper, and because of its generally highly porous nature, paper acts as a hospitable host for most impurities. Because of this, the presence and location of any impurities within recycled paper is impossible to determine and the identity of the contaminants and the various sources of contamination are impossible to predict. In accordance with the present invention, the characteristics and properties of post-consumer recycled paper may be tolerated for use in many packaging applications, with paper from a recycled source being suitably employed for the packaging of products which are normally susceptible to corrosion damage. In addition, recycled paper may be used for the formation of porous hosts such as in the manufacture of packing nuggets or cardboard of various configurations, with solutions or slurries of vapor phase corrosion inhibitor (VCI) materials being coated upon or impregnated into the host material. These host materials may themselves be recycled for further use if appropriate.

SUMMARY OF THE INVENTION

The present invention is directed to packaging items such as paper, cardboard or nuggets which contain a vapor phase corrosion inhibitor therein, with the items comprising post-consumer recycled pulp substrates. When paper is prepared from the recycled pulp, it generally has a vapor impervious coating on one surface thereof, with the vapor impervious coating optionally containing a corrosion inhibitor as well. In other words, the substrate comprises a laminate of post-consumer recycled paper with a water vapor impervious coating such as polyvinylacetate resin along with a quantity of vapor phase corrosion inhibiting materials incorporated in the laminate.

In its preferred form, the vapor phase corrosion inhibitor material is preferably a mixture of powders comprising a quantity of amine salts, alkali metal molybdates, or mixtures of molybdates with a second component such as benzotriazole. Alkali metal molybdates include, of course, sodium and potassium molybdates along with ammonium molybdate. Although other inhibitor materials may be suitable, U.S. Pat. No. 5,139,700, assigned to the same assignee as the present invention, discloses corrosion inhibitors advantageously utilized for protection of materials to be packaged or protected pursuant to the present invention. In order to facilitate utilization of VCI materials in combination with paper substrates based upon pulp which has been recycled as post-consumer recycled paper, the quantity of VCI material employed ranges from between about 3 pounds to 5 pounds for each 3000 square feet of such paper.

In general, one of the products of the present invention comprise a composite paper/resin coating in which the corrosion inhibitor is placed into or on the paper component by application of a vapor phase corrosion inhibitor retaining resin, the retaining resin being applied to the paper portion of the composite in an amount, up to saturation, to form a surface coating or an in-situ retained solid. This is accomplished through the use of a powder slurry or solvent based mixture of VCI/solvent, such as by application as a solution which is absorbed in the substrate, up to an amount approaching saturation, and with the solvent thereafter being released or removed. Aqueous solvents are, of course, utilizable as are other more rapidly drying solvents, such as, for example, ethyl alcohol. With respect to the introduction of VCI material into the resin component, the VCI material may be added to the resin component, and the resin components can be coated or extruded directly onto the surface of the recycled paper substrate. Paper/polyethylene composites are known in the art, and various composites prepared in accordance with the present invention may be created utilizing these materials.

Alternatively, the products of the present invention may consist of a base of post-consumer recycled paper prepared in a configuration for use as a packing aid in cartons containing or otherwise forming an enclosure for a fragile or other type of product requiring such filler for protection and stability from shock or the like. Such packing aid configurations, sometimes characterized as "nuggets" are typically created in forms like styrene nuggets, although other configurations (and shapes) may also be employed. These materials may be impregnated with VCI through immersion in either a slurry or solvent based VCI containing mixture.

Therefore, it is a primary object of the present invention to provide an improved vapor phase corrosion inhibitor packaging material which comprises post-consumer recycled paper or pulp, and wherein the recycled paper forms a package or enclosure, with the recycled paper containing a corrosion inhibitor may be either deposited onto or in the paper, or otherwise combined with a resin film and applied as a coating.

It is a further object of the present invention to provide an improved packaging film which comprises a paper/resin film laminate, wherein each layer contains a vapor phase corrosion inhibitor material.

Other and further objects of the present invention will become apparent to those skilled in the art upon a study of the following specification, appended claims, and accompanying drawing.

IN THE DRAWING

FIG. 1 is a sectional view taken through a vapor phase corrosion inhibitor/substrate packaging material which comprises a post-consumer recycled substrate having a generally vapor impervious coating thereon and further containing a layer of corrosion inhibitor material on the surface of the recycled paper component.

DESCRIPTION OF THE PREFERRED EMBODIMENT

Figure 1:
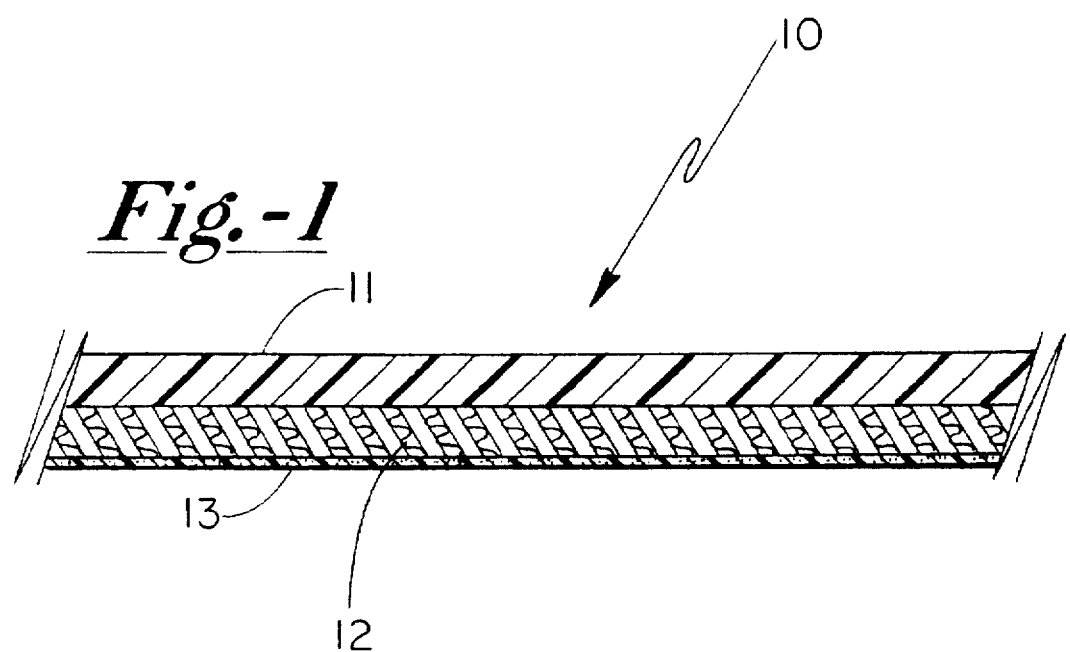

In accordance with the preferred embodiment of the present invention and with particular attention being directed to FIG. 1 of the drawing, the vapor phase corrosion inhibitor/substrate packaging material generally designated 10 comprises a substrate having a generally vapor impervious coating 11 which is disposed on a substrate 12 consisting essentially of post-consumer recycled paper. In contact with the recycled paper layer is a quantity of vapor phase corrosion inhibitor material 13 which is designed to appropriately protect and inhibit corrosion in connection with materials otherwise susceptible to corrosion in the environment to which the packaged materials will be subjected, or otherwise be subject to the effect of corrosion from contact with contaminants which may be present in the recycled paper component.

EXAMPLE I

By way of example, the packaging film 10 utilizes a post-consumer recycled paper substrate 12 having a thickness typically in the range of from between about 5 and 10 mils. The coating 11 preferably consists of a water dispersable resin and may have a thickness of about 2 mils. The post-consumer recycled paper substrate in this application may have a thickness ranging up to about 4 mils, while the resin component may have a thickness ranging up to about 3 mils.

The vapor phase corrosion inhibitor material preferably consists of inhibiting materials such as amine salts, nitrate salts, alkali metal benzoates, alkali molybdates, and triazoles. The quantity of corrosion inhibitor typically applied to the resin ranges from between 3 grams to 5 grams per square meter.

EXAMPLE II

A paper substrate containing a corrosion inhibitor is saturated with a dispersion of polyvinylacetate wherein the paper is post-consumer recycled paper. In such instances, the quantity of VCI material is present in an amount ranging from between 3 and 5 pounds per 3000 square feet, dry resin-free basis.

EXAMPLE III

A paper substrate containing a corrosion inhibitor is saturated with a dispersion of polyvinylethylene wherein the paper is post-consumer recycled paper. In such instances, the quantity of VCI material is present in an amount ranging from between 3 and 5 pounds per 3000 square feet, dry resin-free basis.

EXAMPLE IV

Preparation of Treated Nuggets

Nuggets prepared from recycled paper stock were sprayed with an alcohol based solution of inhibitors to give the desired weight, and dried. When metal was stored in a receptacle containing the treated nuggets, good corrosion protection was obtained. Untreated nuggets did not protect the metal from corrosion.

EXAMPLE V

Recycled pulp is also used in corrugated box manufacture and can be treated to provide corrosion protection as follows:

Corrugated box stock was coated with an aqueous solution of resins and inhibitors, and dried. When a box was formed with the coated side on the inside, metal parts were protected from corrosion. Conversely, without the protective coating, metal in the boxes that are produced are subject to the various corrosive materials that can be present from the recycled pulp material.

GENERAL DISCUSSION

The utilization of a laminate comprising a combination of post-consumer recycled paper and resin films enhances the mechanical strength as well as general durability of the composite laminate, and at the same time, facilitates the utilization of resinous films of lesser cross-sectional thickness. In addition, the utilization of appropriate printing legends may be more readily accomplished with the utilization of layers of post-consumer recycled paper.

Both cost savings realized by the utilization of resin films of lesser cross-sectional thickness, together with the conservation of natural resources and reduction in quantities of materials deposited in landfills may be realized by the utilization of the present invention. The utilization of the vapor phase corrosion inhibitor together with the enhanced effectiveness of the finished product provides an arrangement of components which is both industrially reliable and ecologically viable.

It will be appreciated that the examples provided herein are illustrative only and are not to be construed as a limitation upon the scope of the appended claims.

What is claimed is:

1. Vapor phase corrosion inhibitor/substrate packaging material comprising, in combination, a substrate having vapor phase corrosion inhibitor material bonded integrally therein through application of a vapor phase corrosion inhibitor blended with a resinous host to form a vapor phase corrosion inhibitor retaining resin wherein the resin forming the retaining resin incorporates vapor phase corrosion inhibitors, said combination being further characterized in that:

(a) said substrate comprises a layer of post-consumer recycled paper;

(b) said substrate further comprises vapor phase corrosion inhibitor bonded integrally therein through application of a vapor phase inhibitor retaining resin, wherein the retaining resin is exposed to said substrate in an amount up to saturation;

(c) said retaining resin selected from film forming resins such as polyvinylacetate, vinyl acetate styrene copolymers, and acrylic copolymers; and (d) said vapor phase corrosion inhibitor is selected from the group consisting of alkali metal molybdates, amine salts, sodium benzoates, triazoles, nitrites, and mixtures thereof.

2. The combination as defined in claim 1 being particularly characterized in that said post-consumer recycled paper layer has a thickness ranging from between about 3 mils and 10 mils.

3. The combination as defined in claim 1 is corrugated box stock prepared from recycled pulp that is coated on that surface of the stock exposed to the inside of the subsequent box being formed therefrom.

4. The combination as defined in claim 1 where recycled pulp is formed into nuggets or pellets that are coated with said retaining resin containing vapor corrosion inhibitors.

* * * * *